United States Patent [19]
Ozawa

[11] Patent Number: 5,865,597
[45] Date of Patent: Feb. 2, 1999

[54] LIQUID PUMP FOR PREVENTING CONTACT BETWEEN THE SEALING STRUCTURE AND PRESSURIZED LIQUID

[75] Inventor: Yasuo Ozawa, Kariya, Japan

[73] Assignee: Aisin Seiki Kabushiki Kaisha, Aichi-Pref., Japan

[21] Appl. No.: 625,890

[22] Filed: Apr. 1, 1996

[30] Foreign Application Priority Data

Mar. 31, 1995 [JP] Japan ................................. 7-075848
Jul. 31, 1995 [JP] Japan ................................. 7-194791

[51] Int. Cl.$^6$ .................................................. F04D 29/10
[52] U.S. Cl. ........................ 415/109; 415/111; 415/112; 415/113; 415/168.2; 415/171.1; 415/176; 277/14 R; 277/67; 277/133
[58] Field of Search ................................. 415/109, 111, 415/113, 168.1, 168.2, 171.1, 230, 231, 112, 176; 277/13, 14 R, 67, 133; 123/41.44

[56] References Cited

U.S. PATENT DOCUMENTS

| 3,731,940 | 5/1973 | Spruiell . |
| 4,426,088 | 1/1984 | Ernst . |
| 4,521,151 | 6/1985 | Frater et al. ........................ 415/171.1 |

FOREIGN PATENT DOCUMENTS

| 0473359 | 3/1992 | European Pat. Off. . |
| 2591704 | 6/1987 | France . |
| 2621970 | 4/1989 | France . |
| 1-99997 | 7/1989 | Japan . |
| 4-72110 | 11/1992 | Japan . |
| 6-29517 | 8/1994 | Japan . |
| 0159372 | 6/1957 | Sweden ................................. 415/109 |
| 746428 | 3/1956 | United Kingdom . |
| 1174767 | 12/1969 | United Kingdom . |

OTHER PUBLICATIONS

McDonald, D.P.; "Hydrodynamic Seals—Joints Hydrodynamiques"; *Pumps–Pompes–Pumpen*; pp. 110–114.
European Search Report for EP 96 10 4897, Jul. 1996.

*Primary Examiner*—Christopher Verdier
*Attorney, Agent, or Firm*—Hazel & Thomas, P.C.

[57] ABSTRACT

A pump incorporates a housing with a pump chamber and an internal bore communicating with the pump chamber, and a power driven impeller shaft supported in the housing by at least one bearing in the internal bore. The impeller shaft has an impeller in the pump chamber. A seal mechanism is in the internal bore between the bearing and the pump chamber providing a seal between the impeller shaft and the wall surface of the internal bore. The internal bore has a stepped configuration with small and large diameter portions and a vertical wall defined therebetween. The large diameter portion defines an intermediate chamber between the bearing and the pump chamber and that chamber connects with the pump chamber. The intermediate chamber contains liquid with air being trapped in the remaining portion of the intermediate chamber. The bearing and the seal mechanism are located in the small diameter portion. A partition wall member in the intermediate chamber divides the chamber into a first compartment adjacent the pump chamber and a second compartment adjacent the seal mechanism. The first and second compartments are connected at the upper and radially outer peripheral portion of the intermediate chamber. A device provided on the impeller shaft forces the liquid in the second compartment when the impeller shaft rotates, so as to displace into the first compartment, while the air concentrates in the second compartment around the impeller shaft, thereby excluding liquid from the sealing mechanism.

18 Claims, 10 Drawing Sheets

LIQUID PUMP FOR PREVENTING CONTACT BETWEEN THE SEALING STRUCTURE AND PRESSURIZED LIQUID

FIELD OF THE INVENTION

The present invention relates to a liquid pump such as a water pump. More particularly, the present invention pertains to a liquid pump that can advantageously be used in an internal combustion engine as a cooling water pump for circulating engine cooling water through an engine cooling system, but the present invention is not limited to a water pump for such a use.

BACKGROUND OF THE INVENTION

Conventionally, a water pump for use in an engine cooling system includes a power driven impeller shaft having one end portion connected with a power source such as an output member of an internal combustion engine with the other end being provided with an impeller for drawing water from a source of water such as a water tank and forcing the water to an outlet of the pump. The shaft is mounted on a pump housing for rotation about the axis of the shaft by means of a bearing located at the end portion of the shaft adjacent to the driving power source. The impeller is rotated in the pump chamber together with the impeller shaft to force the water in the pump chamber to the pump outlet.

In order to prevent water in the pump chamber from leaking under the pump pressure prevailing in the pump chamber through the impeller shaft to the bearing, the shaft is provided with a mechanical seal that is mounted on the shaft for slidable engagement with a bore surface of the pump housing. It has been recognized however that a mechanical seal may sometimes produce a squeaking noise in operation because of slipping movements of the seal. Efforts have hithertofore been made for solving the problem. Examples of seals which may substitute for conventional mechanical seals are those having lip seals or seal devices using a magnetic fluid as disclosed for example by the Japanese Laid-Open Utility Model Publication No. Hei 1-99997 (published on Jul. 5, 1989), Japanese Utility Model Publication No. Hei 6-29517 (published on Aug. 10, 1994) and Japanese Patent Publication No. Hei 4-72110 (published on Nov. 17, 1992).

It should however be noted that these sealing structures are not satisfactory since the sealing structures are always subjected to water pressure. The sealing members may show unsatisfactory durability under prolonged contact with water. Further, the sealing members may fail under high water pressure which may be produced in operation. As the results, the sealing structures as proposed by the aforementioned Japanese patent or utility model applications do not show satisfactory reliability.

SUMMARY OF THE INVENTION

The present invention is therefore directed to solving the aforementioned problems in the conventional liquid pumps and has the object of providing a liquid pump that can prevent water leakage effectively without the possibility of producing a squeaking noise.

Another object of the present invention is to provide a sealing structure for a liquid pump which can eliminate the possibility of pressurized liquid contacting with the sealing structure during operation.

In order to accomplish the above and other objects, the present invention provides a liquid pump comprising a housing having a pump chamber and an internal bore communicating with the pump chamber, and a power driven impeller shaft supported in the housing by at least one bearing disposed in the internal bore. The impeller shaft is provided with an impeller located in the pump chamber and secured to the impeller shaft to rotate therewith. A seal mechanism is provided in the internal bore at a position between the bearing and the pump chamber to provide a seal in the space between the impeller shaft and wall surface of the internal bore. As the features of the present invention, the internal bore is in the form of a stepped configuration including a small diameter portion and a large diameter portion with a vertical wall defined therebetween. The large diameter portion of the internal bore defines an intermediate chamber between the bearing and the pump chamber. The intermediate chamber is in communication with the pump chamber and contains liquid to a predetermined level in a stationary condition of the pump, air being entrapped in the remaining portion of the intermediate chamber. The bearing and the seal mechanism are located in the small diameter portion of the internal bore. A partition wall member is provided in the intermediate chamber to divide the intermediate chamber into a first compartment that is adjacent to the pump chamber and a second compartment that is adjacent to the seal mechanism. The first and second compartments are connected together at least at the upper and radially outer peripheral portion of the intermediate chamber. A device is provided on the impeller shaft to rotate therewith and force the liquid in the second compartment to the radially outward portion of the second compartment upon rotation of the impeller shaft so that at least a portion of the liquid in the second compartment is displaced into the first compartment and most of the air in the intermediate chamber is concentrated in the second compartment around the impeller shaft and the sealing mechanism to exclude liquid from the area around the sealing mechanism.

According to one aspect of the present invention, the partition wall member is a disc secured to the impeller shaft to rotate therewith. In this aspect of the present invention, the radially inner portion of the partition wall member constitutes the device for forcing liquid in the second compartment of the intermediate chamber to the radially outer portion of the second compartment and at least partly into the first compartment. It is preferable that the partition wall member is provided at a radially outward peripheral edge with an axially extending peripheral rim portion. It is also preferable that the peripheral rim portion is formed at an axial end opposite to the partition wall member with a radially inwardly extending wall so that an annular space is defined between the partition wall member, the peripheral rim portion and the radially inwardly extending wall. The partition wall member is formed at a radially outward portion with one or more openings for communicating the annular space with the first compartment of the intermediate chamber.

With this preferable aspect of the present invention, liquid in the second compartment of the intermediate chamber is forced under centrifugal action into the radially outward portion of the annular space and a portion of liquid is further forced through the openings in the partition wall member into the first compartment of the intermediate chamber. Thus, the air which is trapped in the first compartment is expelled from the first compartment through a space between the peripheral rim portion and the adjacent inner wall surface of the housing into the second compartment. It is preferable to locate the peripheral rim portion and the radially inwardly extending wall formed on the partition wall member in close vicinity to the adjacent inner wall surface of the housing so that a small clearance is formed therebetween. In this instance, the level of liquid in the intermediate chamber in the stationary state of the pump is determined so that the boundary between the air phase in the second compartment and the liquid phase in the first compartment is produced at this small clearance.

According to another preferable aspect of the present invention, the partition wall member is in the form of an annular member having a central opening and secured at a radially outward peripheral edge portion to the housing. The partition wall member is formed at an upper portion with one or more openings for communicating the second compartment with the first compartment of the intermediate chamber. The impeller shaft has a pumping member secured thereto at a position in the central opening of the partition wall member for forcing liquid in the second compartment to the first compartment upon rotation of the impeller shaft. As the liquid in the second compartment is moved to the first compartment, the air trapped in the first compartment is expelled through the openings in the upper portion of the partition wall member into the second compartment.

It is sometimes preferable to provide an auxiliary seal in addition to the seal mechanism which is located in the small diameter portion of this internal bore. For the purpose, the housing is formed with a radially inwardly extending flange which may be provided as a radially inward extension of the vertical wall between the small diameter portion and the large diameter portion of the internal bore. The auxiliary seal is then provided on the impeller shaft to be in sealing contact with the flange. It is preferable that the auxiliary seal is of a type responsive to a centrifugal force so that it is disengaged from the flange when the impeller shaft is rotated.

According to the features of the present invention, the intermediate chamber contains liquid up to a predetermined level when the pump is not in operation and air is trapped in the space above the liquid level of the intermediate chamber. The intermediate chamber is in communication with the pump chamber which is filled with liquid. The air in the second compartment is constrained in the upper portion of the intermediate chamber under the water head pressure produced by the liquid in the pump chamber. In order to prevent the air in the intermediate chamber from leaking to the pump chamber, it is required to isolate at least the upper portion of the intermediate chamber from the pump chamber. For this purpose, it is generally recommendable to provide a partition member separating the intermediate chamber from the pump chamber. The impeller shaft is passed through the partition member and the pump chamber communicates with the intermediate chamber through an annular clearance between the inner periphery of the partition member and the impeller shaft. In order to ensure that the upper portion of the intermediate chamber is isolated from the pump chamber, it is preferable to provide the impeller shaft in the first compartment with a disc member which is secured to the impeller shaft and located to provide a close clearance with the partition member. The disc member has a diameter which is sufficiently large so that the upper portion of the disc extends beyond the liquid level in the intermediate chamber when the pump is not in operation. It is also preferable that the impeller has an impeller disc which is located at a side of the partition member opposite to the aforementioned disc member on the impeller shaft with a close clearance with respect to the partition member. The close clearances between the partition member and the disc member on the impeller shaft and the impeller disc thus provide a labyrinth passage which effectively prevents air in the intermediate chamber from being transferred to the pump chamber.

In accordance with a further aspect of the present invention, the bearing for rotatably supporting the impeller shaft may not necessarily be provided in the small diameter portion of the internal bore of the housing. According to this feature, the pump housing is provided between the pump chamber and the intermediate chamber with a bearing carrying partition wall and the bearing for supporting the impeller shaft is provided in the central aperture in the bearing carrying partition wall. The bearing may be of a sleeve type made of a material that is resistant to the liquid to be pumped.

Alternatively, the seal mechanism may not necessarily be located in the small diameter portion of the internal bore of the housing in accordance with the present invention. Thus, in accordance with one aspect of the present invention, the housing may have a cylindrical extension which extends from the end of the small diameter portion of the internal bore toward the large diameter portion to provide an annular space in the intermediate chamber. The partition wall member rotatable with the impeller shaft then has a peripheral portion projecting axially to be inserted into the annular space with an appropriate clearance. A seal mechanism is located between the axially projecting peripheral portion of the partition wall member rotatable with the impeller shaft and the cylindrical extension on the housing. It is preferable that the seal mechanism is of a type responsive to a centrifugal force so that the sealing function is lost or at least weakened when the impeller shaft is rotated in operation of the pump.

According to a further different aspect of the present invention, the pump housing is provided between the pump chamber and the intermediate chamber with a bearing carrying partition wall and the bearing for supporting the impeller shaft is provided in the central aperture in the bearing carrying partition wall. The bearing may be of a sleeve type made of a material which is resistant to the liquid to be pumped. The intermediate chamber is divided by a partition wall member which does not have any aperture or opening into a first compartment adjacent to the pump chamber and a second compartment exposed to the seal mechanism. A rotating member is disposed in the second compartment and fitted to the impeller shaft to rotate therewith. In the upper portion, the housing is provided with a bypass passage connecting the upper portion of the first compartment with the second compartment in a manner that an annular space is defined in the second compartment. In this aspect of the present invention, liquid in the second compartment is concentrated in the annular space of the second compartment when the pump is in operation. There may be provided in the first compartment a device which functions to maintain the liquid surface stable during operation of the pump. This device may be a disc secured at the outer periphery to the housing and having blades extending one side surface in the axial direction.

The above and other objects and the features of the present invention will become apparent from the following description of preferred embodiments taking reference to the accompanying drawings.

DESCRIPTION OF THE PREFERRED EMBODIMENTS

Figure 1:
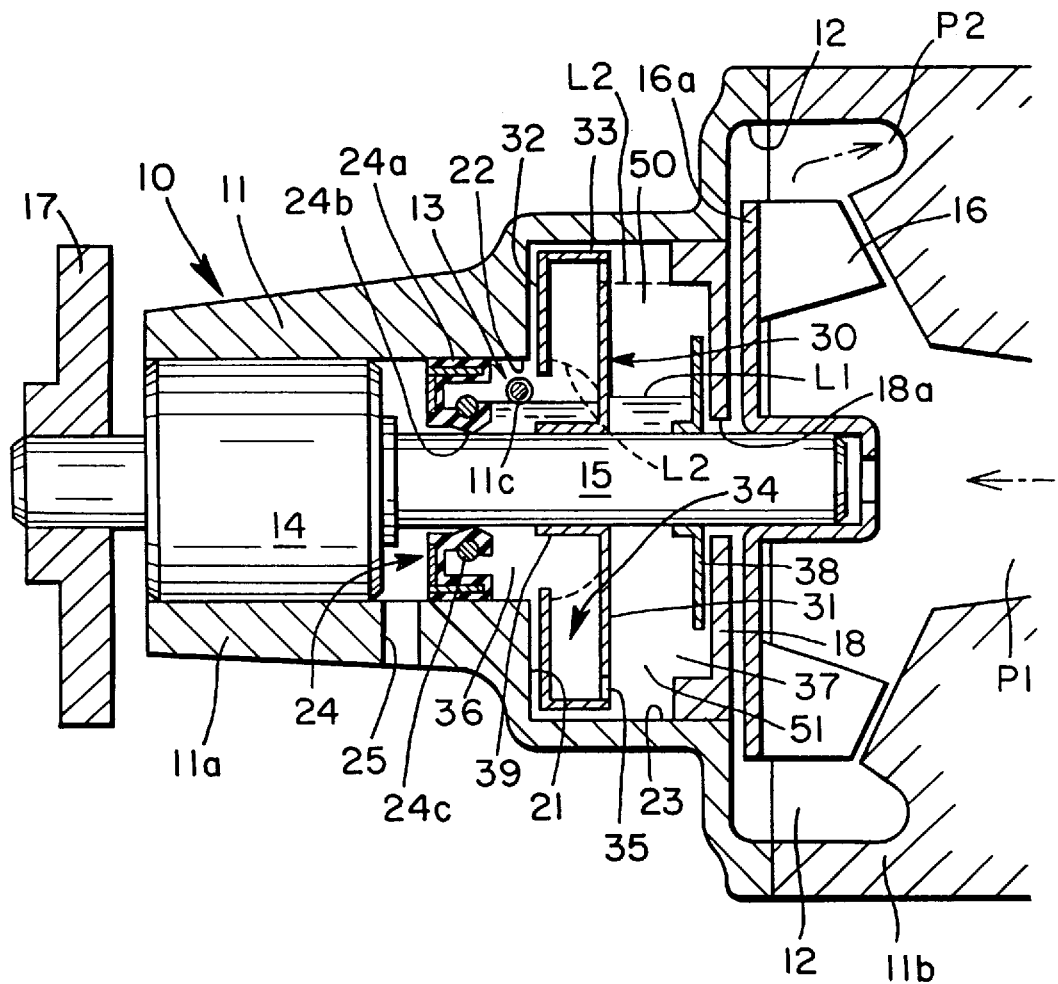
FIG. 1 is a sectional view of a liquid pump in accordance with one embodiment of the present invention.

Referring to the drawings, particularly to FIG. 1, there is shown a liquid pump 10 in accordance with an embodiment of the present invention. In this embodiment, the liquid pump 10 such as a water pump for supplying engine cooling water to an engine cooling system has a pump housing 11 comprised of a first pump housing shell 11a and a second housing shell 11b which are fitted together to complete the housing 11. The second housing shell 11b is a part of an engine's cylinder block.

The first pump housing shell 11a of the pump housing 11 is formed with a stepped axial bore having a smaller diameter portion 22 and a larger diameter portion 23 which are connected with each other through a diametrically extending vertical wall surface 21. A partition member 18 is provided in the first pump housing shell 11a for dividing the inside of the pump housing 11 into a pump chamber 12 and an intermediate chamber 13 which are connected together by a central opening 18a formed in the partition member 18. The second pump chamber shell 11b is formed at an axial end portion with a liquid inlet port P1 and at a radially outer portion with an outlet port P2.

An impeller shaft 15 is disposed to extend in the axial direction in the pump housing 11 and supported for rotation about its own axis by a bearing 14 which is located in the small diameter portion or internal bore 22. The impeller shaft 15 extends beyond an axial end of the pump housing 11 and has a pulley seat 17 secured thereto for attachment to a pulley (not shown) for transmitting engine driving power to the impeller shaft 15. The other end of the impeller shaft 15 extends through the central opening 18a of the partition member 18 provided on the first pump housing shell 11a into the pump chamber 12. An impeller 16 is fitted to the end portion of the impeller shaft 15 and located in the pump chamber 12.

In the intermediate chamber 13, there is provided a partition device 30 including a partition wall member 31 which may be in the form of a circular disc fitted to the impeller shaft 15. The partition wall member 31 divides the intermediate chamber 13 into a first compartment 37 which is adjacent to the pump chamber 12 and a second compartment 36 which is remote from the pump chamber 12. A sealing mechanism 24 is provided in the small diameter portion or internal bore 22 in a position between the bearing 14 and the partition wall member 31 for sealing the space between the internal bore 22 and the impeller shaft 15. A drain hole 25 is formed in the internal bore 22 between the bearing 14 and the sealing mechanism 24 for draining liquid which has leaked through the sealing mechanism 24. The sealing mechanism 24 comprises an outer cylindrical portion 24a fitted to the internal bore 22 in the pump housing shell 11a and an inner lip portion 24b maintained in a slidable sealing contact with the outer surface of the impeller shaft 15 by means of a spring ring 24c.

Figure 2:
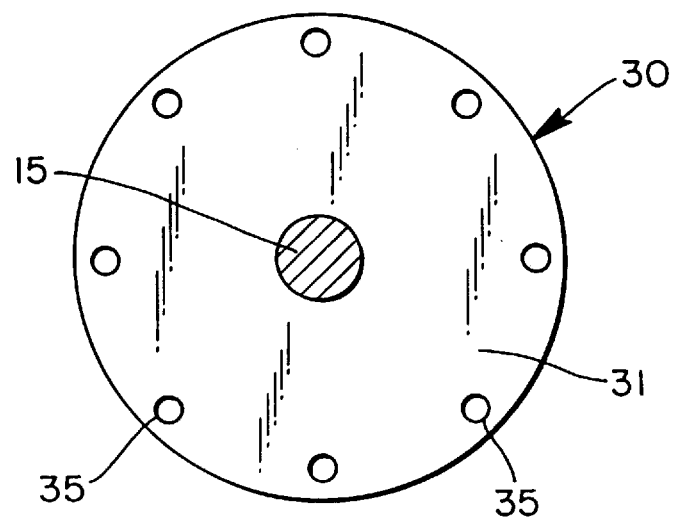
FIG. 2 is a front view of the partition wall member used in the embodiment of FIG. 1.

The partition wall member 31 has a peripheral rim portion 33 which extends in the axial direction from the radially outer periphery of the member 31 and has an axial extreme end contiguous with a radially inwardly extending wall 32. The partition wall member 31 defines together with the peripheral rim portion 33 and the radially inwardly extending wall 32 an annular space 34 which is opened at the radially inward portion to the second compartment 36. The partition wall member 31 is formed at radially outward positions along a circle coaxial with the impeller shaft 15 with a plurality of openings or holes 35 as shown in FIG. 2 for communicating the second compartment 36 with the first compartment 37. The partition wall member 31 further includes an axially extending cylindrical portion 39 that is secured in the outer surface of the impeller shaft 15.

As shown in FIG. 1, the peripheral rim portion 33 of the partition device 30 is located close to the inner wall surface of the large diameter portion 23 of the pump housing shell 11a to provide a close clearance therewith. Similarly, the radially inwardly extending wall 32 is located close to the vertical wall surface 21 of the pump housing shell 11a to provide a close clearance therewith. Thus, a narrow clearance of an L-shaped sectional configuration is defined between the inner wall surface of the pump housing shell 11a and the outer surface of the partition device 30. It will further be noted in FIG. 1 that the impeller shaft 15 is provided with a disc 38 which is secured to the impeller shaft 15 and located in the intermediate chamber 13 close to the partition member 18 to provide a close clearance between the disc 38 and the partition member 18. The impeller 16 has a disc member 16a which is located close to the partition member 18 to provide a close clearance therewith. Thus, a labyrinth passage is provided between the pump chamber 12 and the intermediate chamber 13.

In operation of the pump 10 shown in FIG. 1, by drawing liquid to be pumped such as engine cooling water through the inlet port P1 into the pump chamber 12, the liquid is then passed through the labyrinth passage formed between the partition member 18 and the discs 16a and 38 into the intermediate chamber 13. The pump housing shell 11a is formed with a leveling aperture 11c which is plugged when the liquid in the intermediate chamber 13 reaches the level L1 shown in FIG. 1. Thereafter, liquid continues to be drawn through the inlet port P1 into the pump chamber 12 until the pump chamber 12 is filled with liquid. In this instance, the lower portion 51 of the intermediate chamber 13 is filled with the liquid whereas air is entrapped in the upper portion 50 of the intermediate chamber 13. The labyrinth passage formed between the partition member 18 and the discs 16a and 38 prevents air entrapped in the upper portion 50 of the intermediate chamber 13 from moving into the pump chamber 12. The sealing mechanism 24 is partly dipped in the liquid in the lower portion 51 of the intermediate chamber 13 and partly exposed to the air in the upper portion 50 of the intermediate chamber 13. Since the liquid in this instance is not pressurized, substantially no load is applied to the seal 24. The inner lip portion 24b of the seal 24 can effectively prevent liquid leakage.

For operating the pump 10, the impeller shaft 15 is driven by an engine or other power source. The impeller 16 draws liquid from a liquid source such as a water tank (not shown) through the inlet port P1 into the pump chamber 12 where the liquid is force under the function of the impeller 16 to the pump outlet port P2.

The partition device 30 is also driven by the impeller shaft 15 so that the liquid in the intermediate chamber 13 is caused to rotate about the impeller shaft. The liquid in the second compartment 36 is then forced under the centrifugal action into the annular space formed in the partition device 30. A part of the liquid forced into the annular space then flows into the first compartment 37 to displace the air in the first compartment 37 into the second compartment 36 through the clearance formed between the peripheral rim portion 33 and the radially inwardly extending wall 32 of the partition device 30 and the inner wall surface of the pump housing shell 11a. As the results, there is established a condition of equilibrium wherein a border between the air phase and the liquid phase is maintained at the annular space in the partition device 30 as shown by L2 in FIG. 1. A further border between the air phase and the liquid phase is maintained at the small clearance between the peripheral rim portion 33 and the radially inwardly extending wall 32 of the partition device 30 and the inner wall surface of the pump housing shell 11a. The level L1 of liquid under the non-operating condition of the pump is appropriately determined so that this condition of equilibrium can be established. Under the condition, the sealing mechanism 24 is sounded by air so that it is not brought into contact with liquid under pressure. Therefore, reliability of the sealing mechanism can be enhanced.

Figure 3:
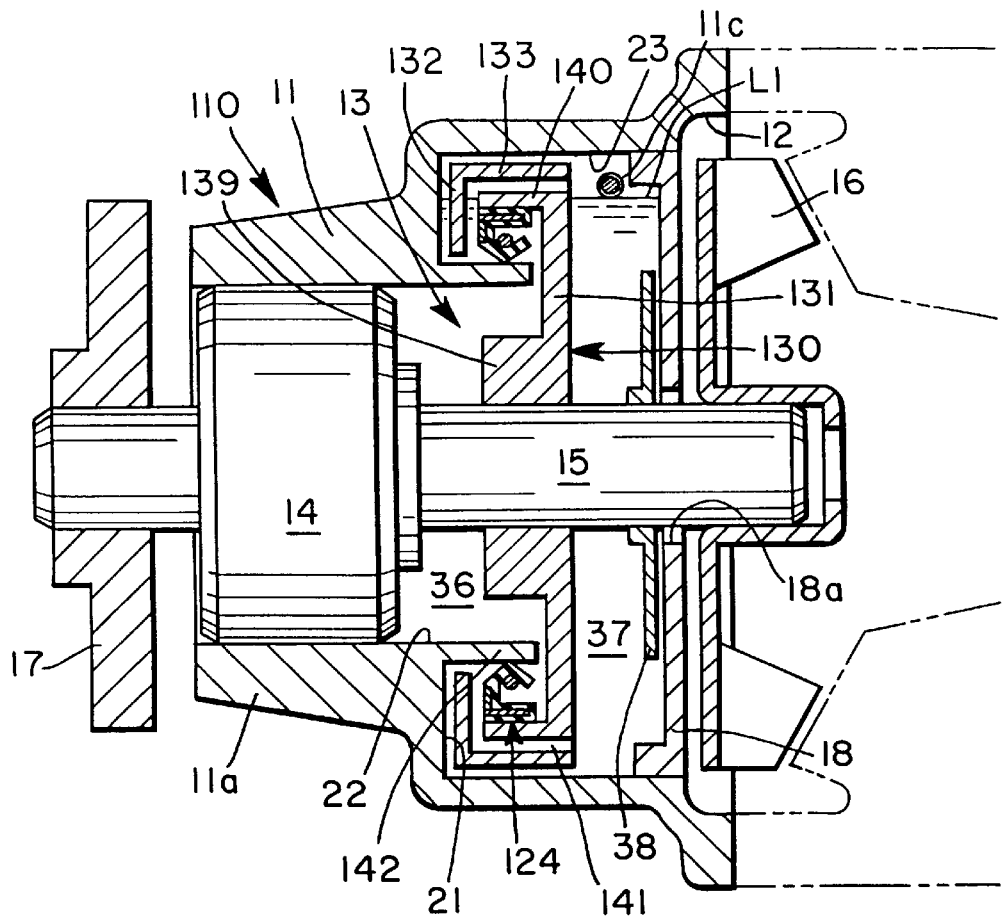
FIG. 3 is a sectional view of a liquid pump in accordance with another embodiment of the present invention.
Figure 4:
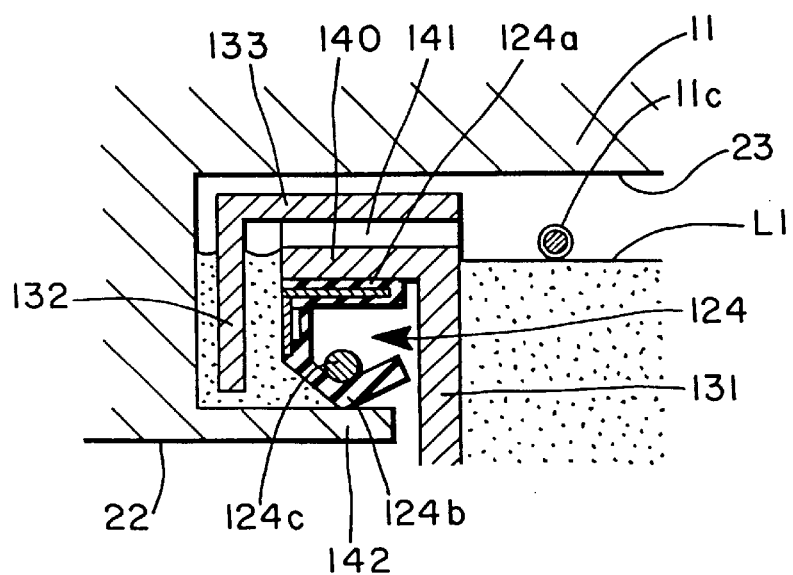
FIG. 4 is an enlarged sectional view specifically showing the sealing mechanism in the liquid pump shown in FIG. 3 when the pump is not in operation.
Figure 5:
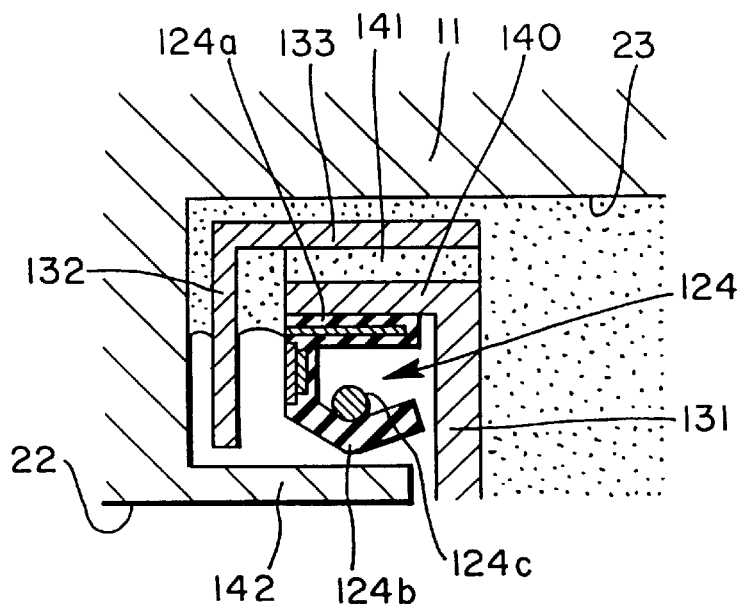
FIG. 5 is a sectional view similar to FIG. 4 but showing the sealing mechanism when the pump in operation.

Referring to FIGS. 3 to 5, there is shown a liquid pump 110 in accordance with another embodiment of the present invention. In the drawings, corresponding parts are designated by the same reference numerals and detailed description will be omitted. The pump housing shell 11a in this embodiment has a cylindrical extension 142 extending from the small diameter portion 22 into the intermediate chamber 13 toward the partition member 18. It will therefore be noted that an annular space is formed between the large diameter portion 23 of the pump housing shell 11a and the cylindrical extension 142.

On the impeller shaft 15, there is provided a partition device 130 which corresponds to the partition device 30 in the previous embodiment. The partition device 130 includes a partition wall member 131 which is fitted at the inner periphery to the impeller shaft 15. The partition wall member 131 is formed at the outer peripheral portion with an axial projection which is located in the annular space between the inner wall surface of the large diameter portion 23 and the outer surface of the cylindrical extension 142 and including a peripheral rim portion 133 and a radially inwardly extending wall 132. Along the peripheral rim portion 133 and the radially inwardly extending wall 132, the partition wall member 131 is formed with a suitable number of circumferentially spaced passages 141 of substantially L-shaped configuration. A clearance is formed between the inner wall surface of the pump housing shell 11a and the peripheral rim portion 133 and the radially inwardly extending wall 132 of the partition device 130 as in the previous embodiment. In addition, the partition wall member 131 has an axially extending cylindrical portion 139 that is secured on to the outer surface of the impeller shaft 15.

Radially inward the peripheral rim portion 133, the partition device 130 is provided with a sealing mechanism 124 which includes a cylindrical portion 124a fitted to the inner surface of the peripheral rim portion 133 and a sealing lip 124b. As clearly shown in FIGS. 4 and 5, the sealing mechanism 124 includes a spring ring 124c which forces the sealing lip 124b in the radially inward direction under a predetermined bias force so that the lip portion 124b is normally maintained in sealing contact with the outer surface of the cylindrical extension 142 as shown in FIG. 4.

In this embodiment, liquid in the first compartment 37 is maintained at a level as shown by L1 in FIG. 4. Liquid is also entrapped in the passages 141 and the clearance between the inner wall surface of the pump housing shell 11a and the members 132 and 133 of the partition device 130. The second compartment 36 is maintained substantially free from liquid. In operation, the liquid in the passages 141 and the clearance between the inner wall surface of the pump housing shell 11a and the members 132 and 133 of the partition device 130 is expelled under the centrifugal force to the first compartment 37 and the air in the first compartment 37 is displaced in turn into the passages 141 and the clearance between the inner wall surface of the pump housing shell 11a and the members 132 and 133 of the partition device 130. The seal lip 124b is displaced radially outwardly under the centrifugal force as shown in FIG. 5 so that the second compartment 36 is opened to the passages 141 and the aforementioned clearance. Therefore, any liquid which has been retained in the second compartment 36 is also displaced into the passages 141 and the aforementioned clearance. Thus, a condition of equilibrium is established as shown in FIG. 5. The sealing lip 124b of the sealing mechanism 124 is maintained substantially free from the liquid.

Figure 6:
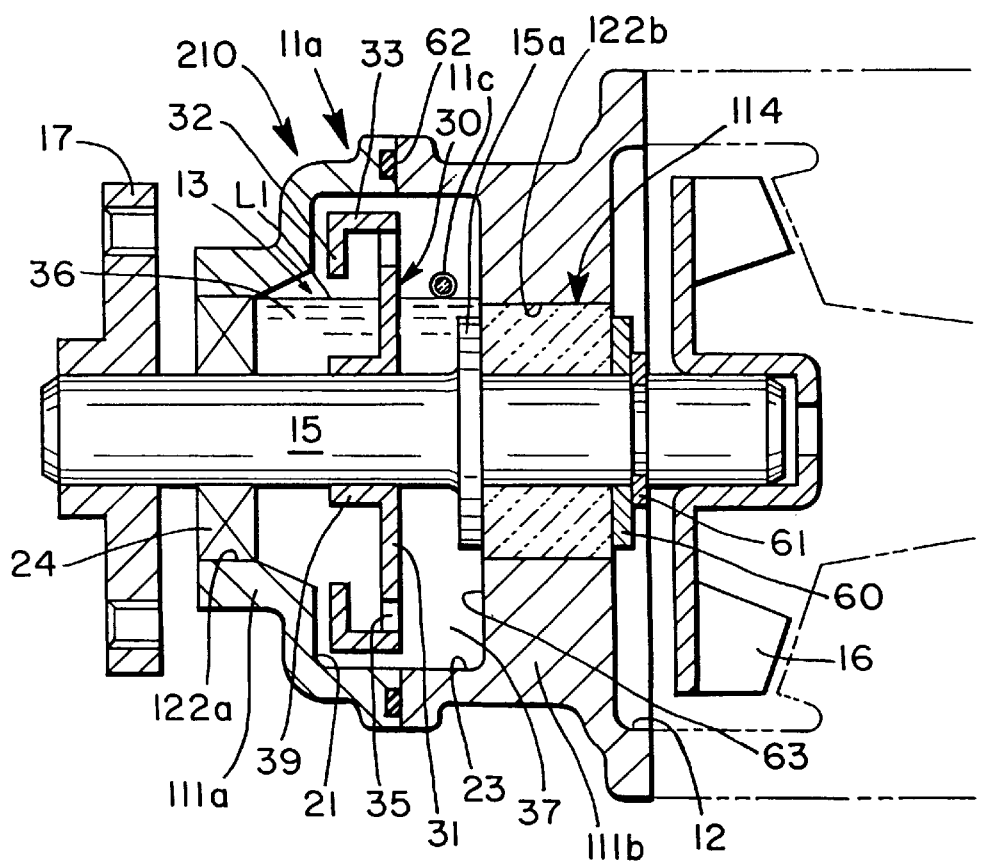
FIG. 6 is a sectional view showing a liquid pump in accordance with a further embodiment of the present invention.

Referring to FIG. 6, there is shown a liquid pump in accordance with a further embodiment of the present invention. This embodiment is basically the same as the previous embodiment shown in FIG. 1 except that the impeller shaft 15 is rotatably supported by means of a sleeve bearing 114 made of a phenol resin or a sintered material. Therefore, in FIG. 6, corresponding parts are shown by the same reference numerals as in the embodiment of FIG. 1 and detailed description will be omitted.

Referring to FIG. 6, the liquid pump 210 shown therein includes a pump housing 11 comprised in part of a pump housing shell 11a which is of a two-part structure including a first shell half 111a and a second shell half 111b which are connected together at mating surfaces through an O-ring seal 62. The shell halves 111a and 111b are formed with stepped bores comprising small diameter portions 122a and 122b, respectively, and large diameter portions 23. The large diameter portions 23 of the shell halves 111a and 111b are of the same diameter and the shell halves are mated together so that the large diameter portions 23 provide a single chamber 13.

The aforementioned sleeve bearing 114 is disposed in the small diameter portion 122b of the stepped bore of the second shell half 111b and rotatably supports the impeller shaft 15. The impeller shaft 15 is formed with a flange 15a which is in abutting engagement with the vertical inner wall surface 63 of the shell half 111b and one end of the sleeve bearing 114. The impeller shaft 15 is further provided with a retaining washer 60 which is maintained in position by a retaining ring 61 fitted in an annular groove in the impeller shaft 15. The retaining washer is positioned to engage with the other end of the sleeve bearing 114 and the inner wall surface of the pump chamber 12. The arrangement is effective to retain the axial position of the impeller shaft 15.

A sealing mechanism 24 is provided in the small diameter portion 122a of the shell half 111a to provide a liquid tight seal between the small diameter portion 122a of the shell half 111a and the impeller shaft 15. In this embodiment, the intermediate chamber 13 is separated from the pump chamber 12 by the sleeve bearing 114. However, the intermediate chamber 13 is charged with liquid to a level L1 with reference to the embodiment of FIG. 1 so that the sleeve bearing 114 is always maintained in the liquid. The partition device 30 functions to displace liquid in the second compartment 36 to the first compartment 37 to thereby maintain the sealing mechanism 24 free from the liquid. The liquid pump of this embodiment can be manufactured less expensively since it uses a sleeve bearing 114 which can be obtained with a lower cost as compared with roller bearings.

Figure 7:
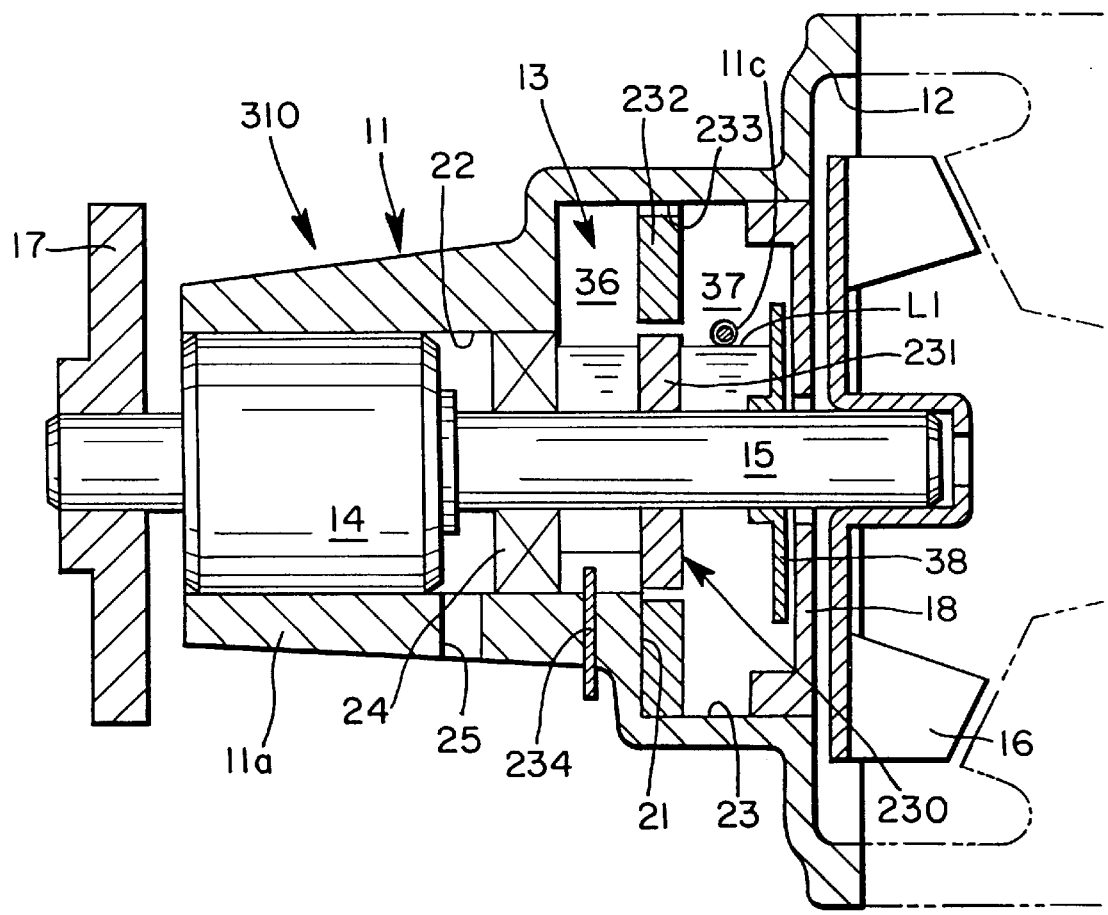
FIG. 7 is a sectional view of a liquid pump in accordance with a further embodiment of the present invention.
Figure 8:
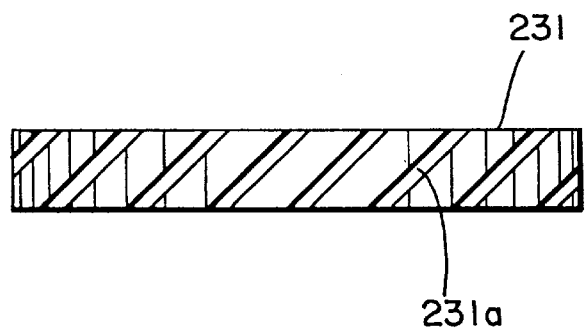
FIG. 8 is an upper plan view of the pumping member used in the embodiment of FIG. 7.

Referring now to FIGS. 7 and 8, there is shown a liquid pump 310 in accordance with a further embodiment of the present invention. Again, in this embodiment, the basic structure is substantially the same as in the embodiment shown in FIG. 1. The embodiment of FIGS. 7 and 8 however includes a partition device 230 comprised of an inner disc 231 fitted to the impeller shaft 15 and an outer annular member 232 fitted to the pump housing shell 11a at the large diameter portion 23. The outer annular member 232 has an inner diameter which is slightly larger than the outer diameter of the inner disc 231 and arranged coaxially with the inner disc 231. The first compartment 37 and the second compartment 36 are communicated with each other by an opening 233 formed in the upper peripheral portion of the annular member 232. The housing shell pa is further provided with a water level sensor 234 which extends upwardly into the second compartment 36.

In this embodiment, the inner disc is formed at the outer periphery with a plurality of spiral grooves 231a as shown in Figure B. Thus, it will be noted that the inner disc 231 forms an axial flow pump together with the inner periphery of the outer annular member 232. Therefore, as the impeller shaft 15 is driven by an external driving power source, the liquid in the second compartment 36 is forced by means of the axial flow pump formed by the inner disc 231 and the inner periphery of the outer annular member 232 to flow into the first compartment 37 displacing the air in the first compartment 37 through the opening 233 formed in the outer annular member into the second compartment 36. Therefore, it is possible to maintain the sealing mechanism 24 free from the liquid. The liquid level sensor 234 detects the liquid in the second compartment 36 in the intermediate chamber 13 and produce a warning signal in the case where liquid is sensed during normal operation of the pump 310.

Figure 9:
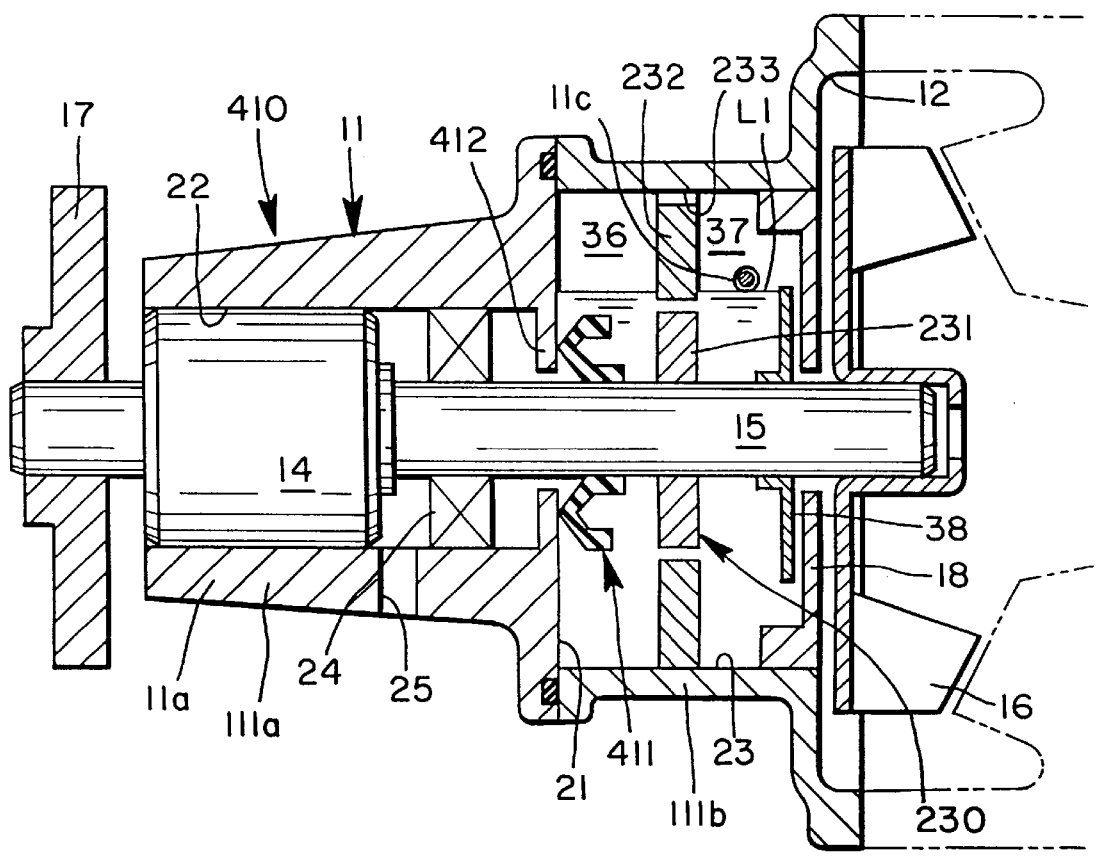
FIG. 9 is a sectional view of a liquid pump in accordance with a still further embodiment of the present invention.
Figure 10:
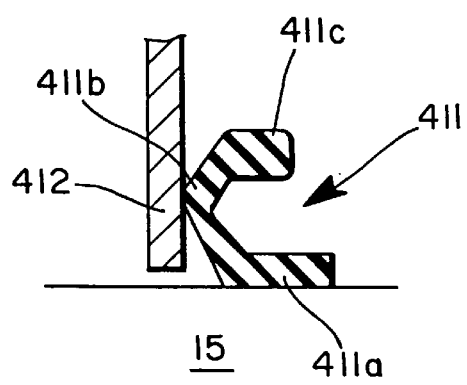
FIG. 10 is an enlarged sectional view of the sealing mechanism used in the embodiment shown in FIG. 9 specifically showing the condition when the pump is not in operation.
Figure 11:
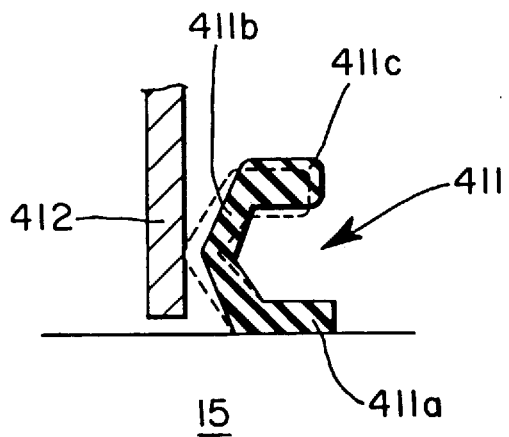
FIG. 11 is an enlarged sectional view of the sealing mechanism shown in FIG. 10 but showing the condition when the pump is in operation.

Referring further to FIGS. 9 through 11, there is shown a liquid pump 410 in accordance with a further different embodiment of the present invention. In this embodiment, the pump housing shell 11a of the pump housing 11 is made of a first shell half 111a and a second shell half 111b which are connected together. The first shell half 111a has an internal bore 22 which corresponds to the small diameter portion 22 of the embodiment shown in FIGS. 7 and 8. The second shell half 111b has an internal bore 23 which corresponds to the large diameter portion 23 in the embodiment shown in FIGS. 7 and 8. At an end adjacent to the shell half 111b, the shell half 111a is formed with a radially inwardly extending flange 412 having a central opening through which the impeller shaft 15 extends. The impeller shaft 15 has an auxiliary lip seal 411 which is fitted thereto at an inner cylindrical portion 411a formed on the lip seal 411. The lip seal 411 further has a lip portion 411b continuing at the radially inner portion to the inner cylindrical portion 411a and at the radially outer portion to an outer cylindrical portion 411c as shown in FIGS. 10 and 11. In other respects, the structure of this embodiment is similar to the structure in the embodiment shown in FIGS. 7 and 8.

When the pump 410 is not in operation, the lip portion 411b of the lip seal 411 is in sealing contact with the flange 412 on the shell half 111a as shown in FIG. 10. As the impeller shaft 15 is driven for the operation of the pump 410, the centrifugal force produced in the outer cylindrical portion 411c causes the lip seal 411 to deform so that the lip portion 411b is moved apart from the contact with the flange 412 as shown in FIG. 11. It will therefore be noted that in operation of the pump 410 liquid which may be in the internal bore 22 of the shell half 111a is expelled through the second compartment 36 in the shell half 111b into the first compartment 37. When the pump 410 is stopped, the lip portion 411b of the lip seal 410 returns to the position to contact with the flange 412 to prevent liquid from entering the internal bore 22. Since the lip seal 411 is maintained out of contact with the flange during operation of the pump 410, it is possible to increase the life of the seal 411.

Figure 12:
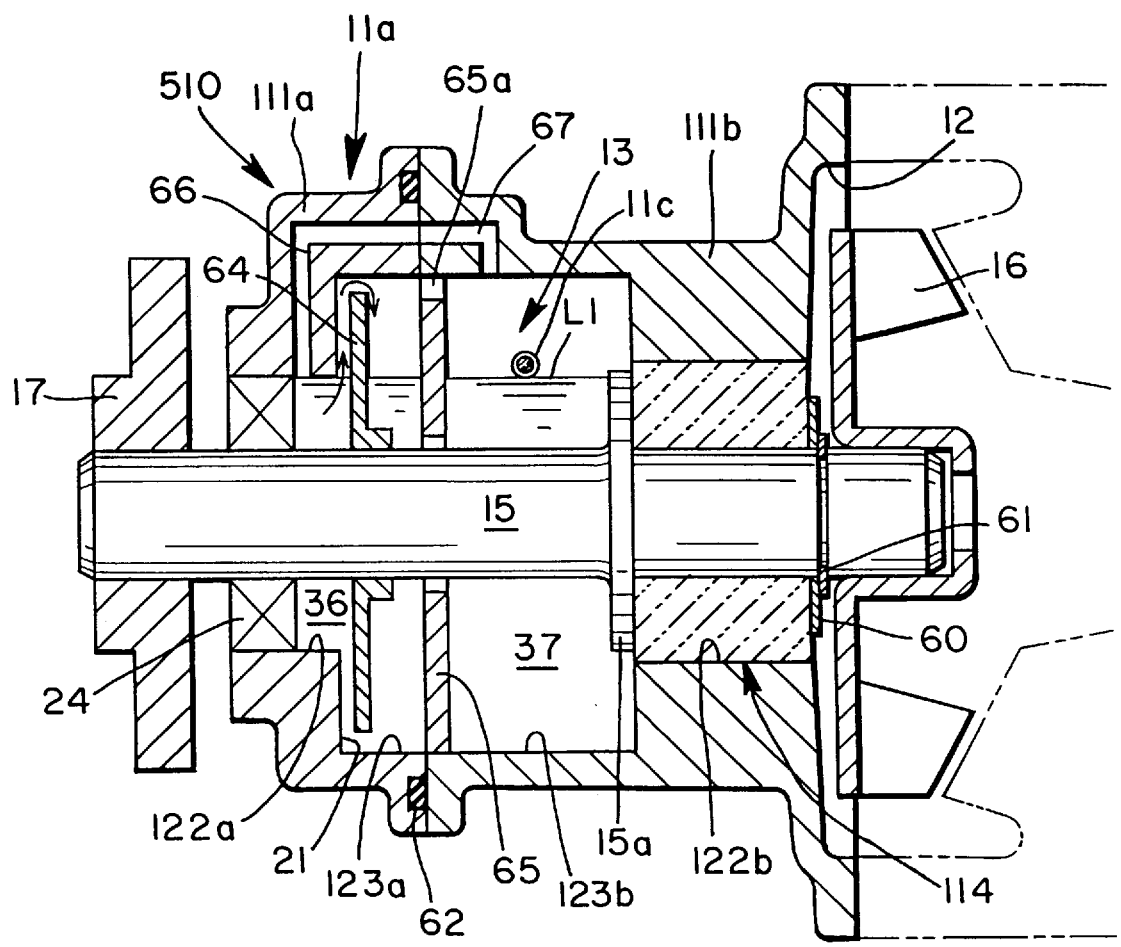
FIG. 12 is a sectional view of a liquid pump in accordance with a still further embodiment of the present invention.

FIG. 12 shows a liquid pump 510 in accordance with a further different embodiment of the present invention. This embodiment is similar to the embodiment shown in FIG. 6 so that corresponding parts are designated by the same reference numerals and detailed description will be omitted. In this embodiment, the shell half 111a has a stepped bore including a small diameter portion 122a and a large diameter portion 123a. The pump 510 includes a partition device comprising a first disc 64 fitted to the impeller shaft 15 at a location in the shell half 111a and a second disc 65 secured to the shell half 111b of the pump housing shell 11a. A first compartment 37 is defined in the right side of the second disc 65 whereas a second compartment 36 is defined in the left side of the disc 64. In the upper portion of the pump housing shell 11a, there is formed a bypass passage comprised of a passage portion 66 formed in the shell half 111a and a passage portion formed in the shell half 111b for providing an air path bypassing the discs 64 and 65. As shown in FIG. 12, the first disc 64 is located in a position close to the vertical inner wall surface 21 of the shell half 111a to provide a small clearance between the wall surface 21 and the disc 64. The disc 64 further provides a small clearance between the outer periphery and the inner surface of the large diameter portion 123a of the bore in the shell half 111a. The second disc 65 is formed at an upper portion with an opening 65a which connects the first compartment 37 with a space between the discs 64 and 65.

When the pump 510 is not in operation, the inside chamber 13 in the pump housing shell 11a is filled with liquid to the level shown by L1. In operation of the pump 510, the liquid in the second compartment 37 is forced to flow through the clearance between the first disc 64 and the inner wall surface of the shell half 111a to the space between the discs 64 and 65, and then through the opening 65a in the second disc 65 into the first compartment 37. The air in the first compartment 37 is therefore displaced through the bypass passage comprising the passage portions 66 and 67 into the first compartment 36 to maintain the seal 24 free from liquid. The second disc 65 is effective to maintain the liquid level in the first compartment 37.

Figure 13:
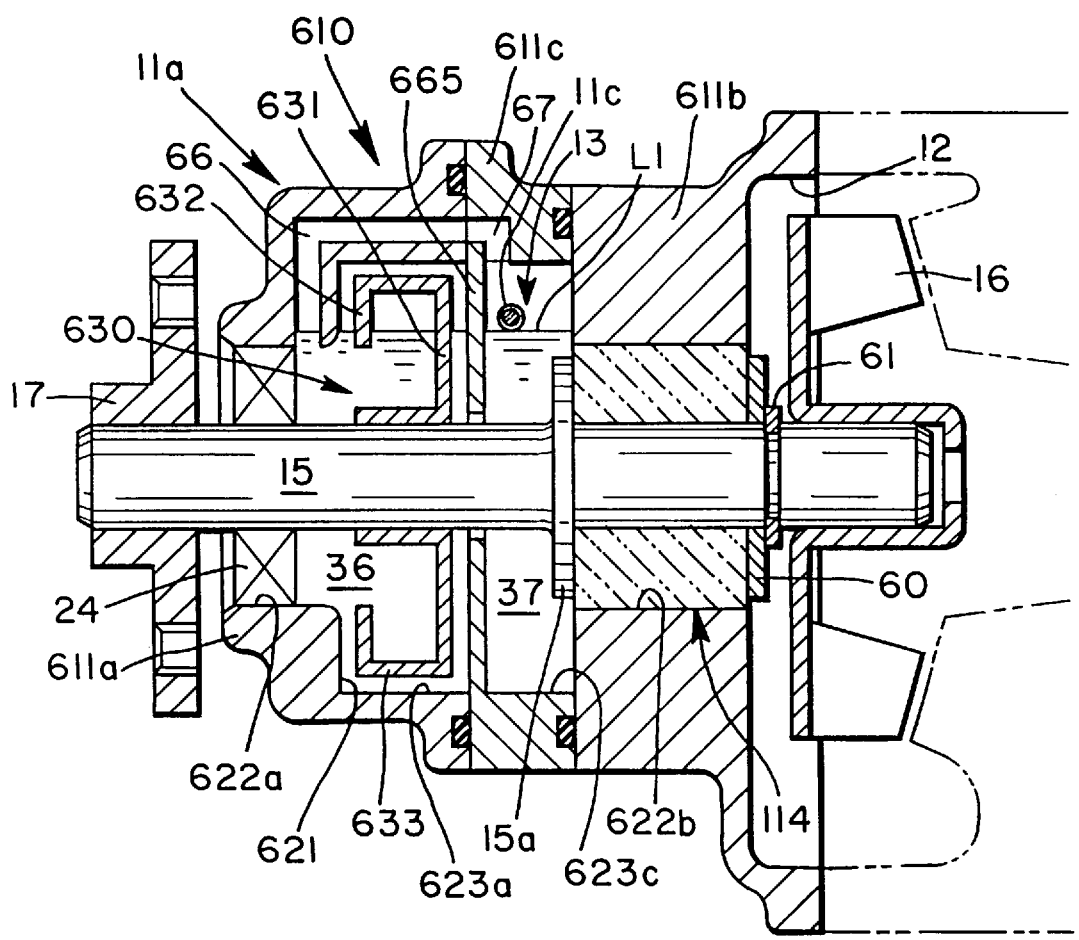
FIG. 13 is a sectional view showing still a further embodiment of the present invention wherein the liquid level is shown in a state when the pump is not in operation.

FIG. 13 shows a liquid pump 610 in accordance with a modification of the structure shown in FIG. 12. In this modification, the pump housing shell 11a is constituted by three parts including a housing shell half 611a, a bearing housing 611b and a center piece 611c located between the shell half 611a and the bearing housing 611b. The bearing housing 611b carries the sleeve bearing 114 which is accommodated in a central bore 622b formed on the bearing housing 611b. The housing shell half 611a is similar in configuration to the shell half 111a of the embodiment shown in FIG. 12 and has a stepped bore including a small diameter portion 622a and a large diameter portion 623a. A vertical wall surface 621 is formed between the small diameter portion 622a and the large diameter portion 623a. The center piece 611c has a bore 623c which is of a diameter equal to that of the large diameter portion 623a of the bore in the shell half 611a. There is provided in the center piece 611c a partition wall 665 which corresponds to the second disc 65. The partition wall 665 is integral with the center piece 611c and located at an end surface adjacent to the shell half 611a so as to separate the first compartment 37 in the center piece 611c from the second compartment 36 in the shell half 611a. A bypass passage including passage portions 66 and 67 is formed in the shell half 611a and the center piece 611c to bypass the partition wall 665.

In the second compartment 36, there is provided a rotating member 630 fitted to the impeller shaft 15 to rotate therewith. The rotating member 630 is similar in configuration to the partition device 30 in the embodiment shown in FIG. 1 except that the no aperture or opening is formed in the member 630. The rotating member 630 has a disc 631 secured at a radially inner portion to the impeller shaft 15, a peripheral rim portion 633 extending in the axial direction from the radially outer edge of the disc 631 and a radially inwardly extending wall portion 632.

Figure 14:
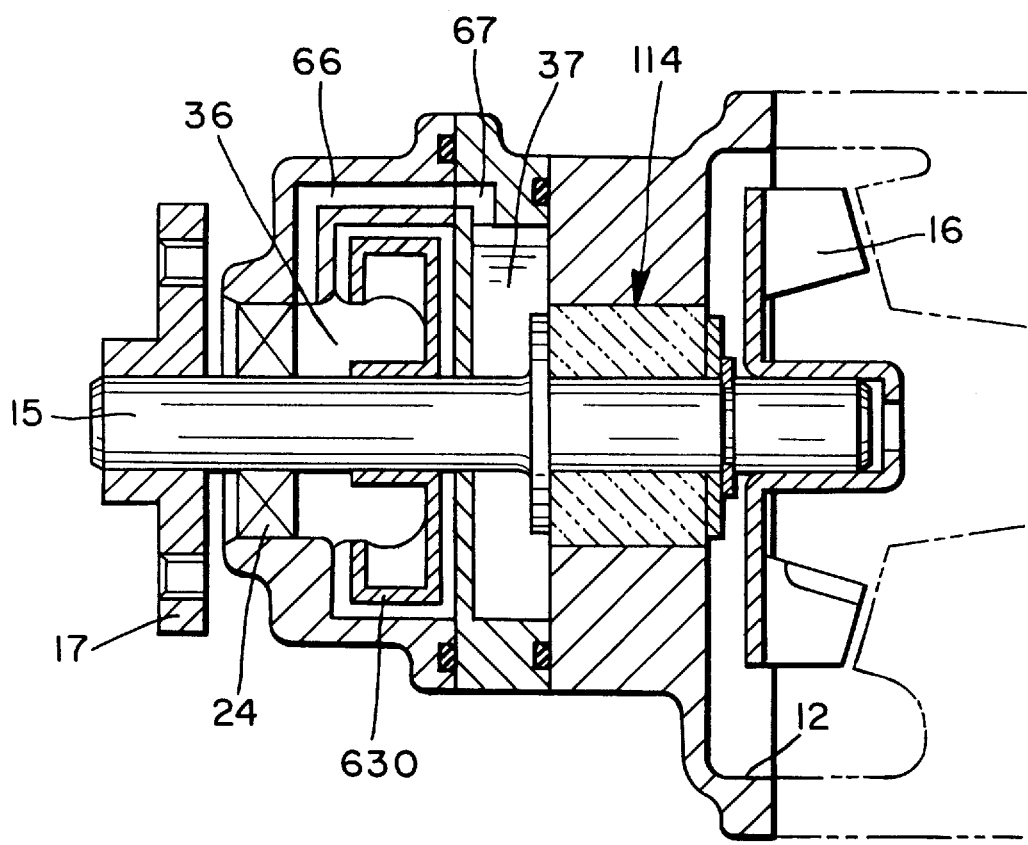
FIG. 14 is a sectional view of the pump shown in FIG. 13 but showing the liquid level in a state when the pump is in operation.

As shown in FIG. 13, the first compartment 37 in the center piece 611c and the second compartment 36 in the shell half 611a are filled with liquid to a level L1 when the pump 610 is not in operation. When the pump 610 is operated, the liquid in the second compartment 36 is moved as shown in FIG. 14 into the space defined by the partition wall 665, the large diameter portion 623a and the vertical wall surface 621. A part of the liquid is also retained in the rotating member 630. In this manner, the seal 24 is maintained free from liquid.

Figure 15:
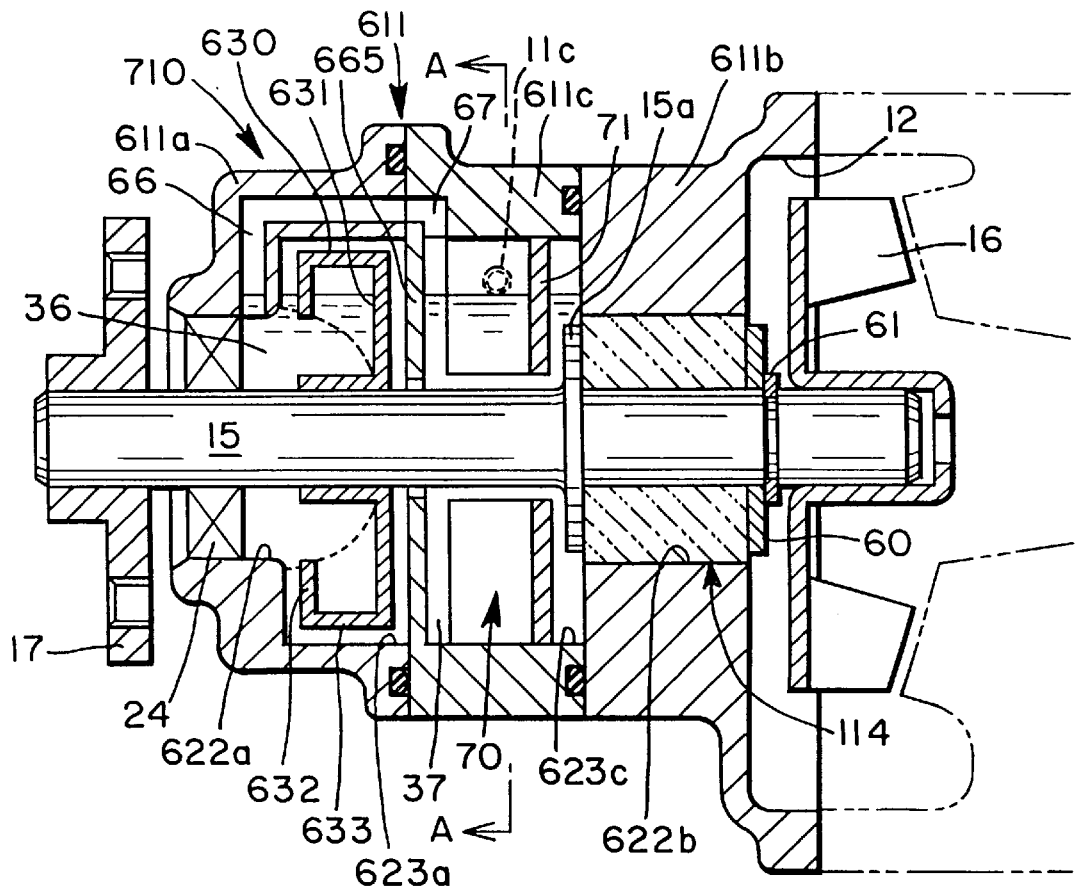
FIG. 15 is a sectional view of a liquid pump in accordance with a further embodiment of the present invention.
Figure 16:
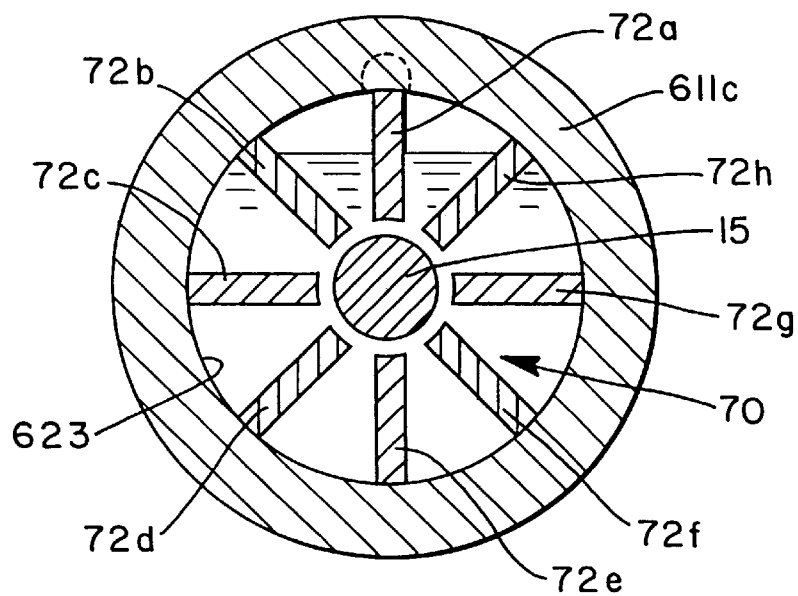
FIG. 16 is a sectional view taken substantially along the line A—A in FIG. 15.

Referring to FIGS. 15 and 16, there is shown a liquid pump 710 which is a further modification of the structure shown in FIG. 13. In this modification, the center piece 611c is provided with a liquid stabilizing device 70. The device 70 includes a disc 71 secured at the outer periphery to the center piece 611c and a plurality of blades 72a through 72h provided on one side surface of the disc 71 to extend in axial direction of the pump. The disc 71 has a central opening through which the impeller shaft 15 is passed. It has been found that the device 70 is effective to stabilize the liquid surface.

Figure 17:
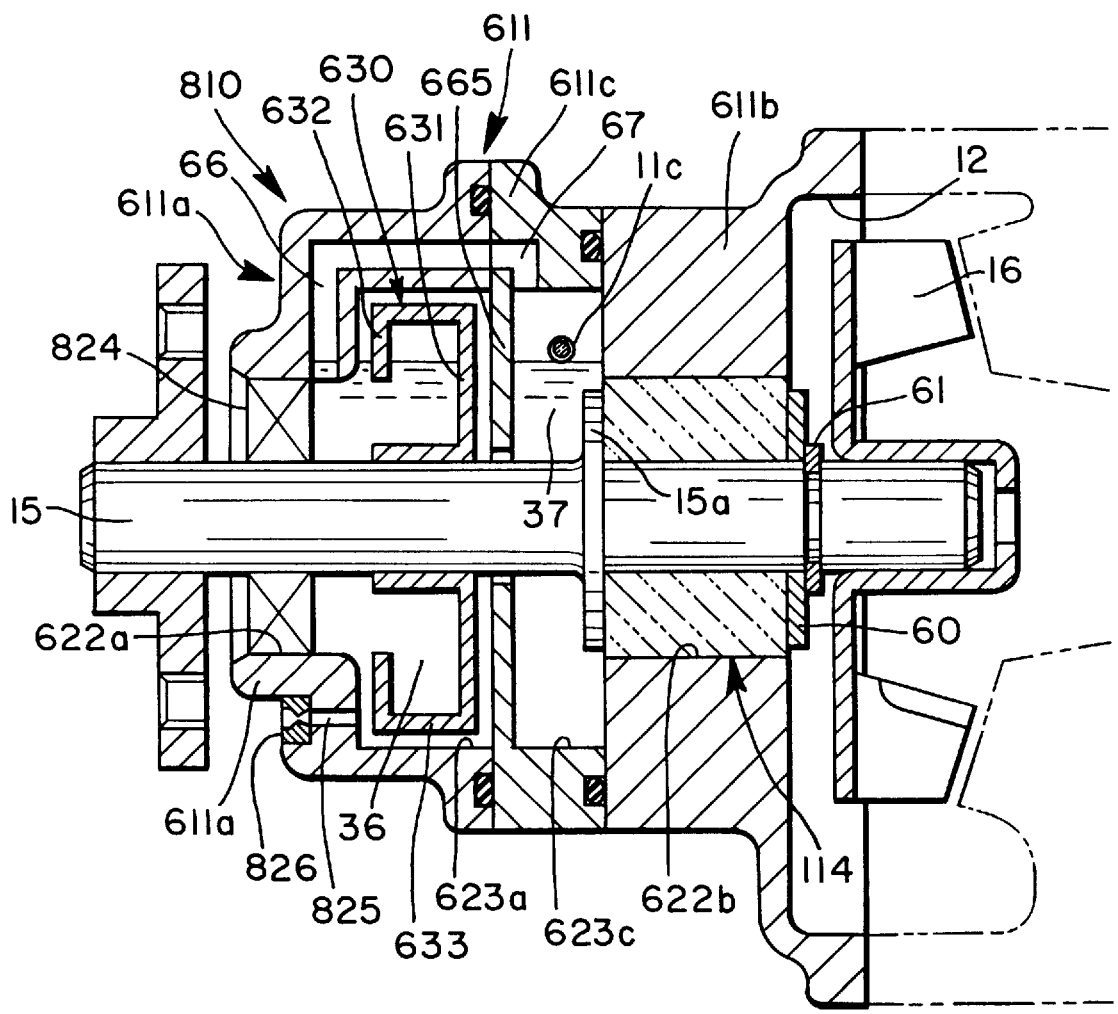
FIG. 17 is a sectional view of a liquid pump in accordance with a still further embodiment of the present invention; and, FIG. 18 is a sectional view in an enlarged scale of the sealing mechanism used in the embodiment of FIG. 17.
Figure 18:
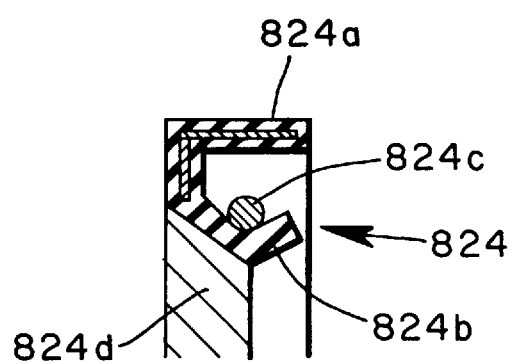

FIGS. 17 and 18 show a liquid pump 810 in accordance with a further modification of the structure shown in FIG. 13. In this modification, the pump 810 has a sealing mechanism 824 which includes as shown in FIG. 18 an outer cylindrical portion 824a fitted to the small diameter portion 622a of the bore in the shell half 611a and a sealing lip 824b adapted to be brought into sealing engagement with the impeller shaft 15. The sealing mechanism 824 is also provided with a split spring ring 824c which forces the sealing lip 824b with a predetermined force into engagement with the impeller shaft 15. The shell half 611a is provided with a drain hole 825 for allowing communication between the second compartment 36 and the atmosphere. A conventional ventilation valve 826 is disposed on an opening of the drain hole 825 so as to pass only air therethrough, and not any liquid. As shown in FIG. 18, the sealing lip 824b is formed at a side surface faced to axially outward direction with a plurality of spiral grooves 824d. In this structure of the sealing mechanism 824, the sealing lip 824b is maintained in sealing engagement with the impeller shaft 15 when the pump 810 is not in operation so that liquid leakage through the sealing mechanism 824 can effectively be prevented. However, when the pump 810 is operated, the biasing force applied by the split spring ring 824c is decreased due to the centrifugal force, air is drawn through the spiral grooves 824d into the second compartment 36 if the quantity of air in the compartment 36 is insufficient. When an extra amount of air is sucked into the compartment 36 by means of the spiral grooves 824d, that extra air will be forced to be drawn out through the ventilation valve 826.

The invention has thus been shown and described with reference to specific embodiments, however, it should be noted that the invention is in no way limited to the details of the illustrated structures but changes and modifications can be made without departing from the scope of the appended claims.

I claim:

1. A liquid pump, comprising:

a housing having a pump chamber and an internal bore of a stepped configuration including a small diameter portion and a large diameter portion with a radial wall surface therebetween, said large diameter portion defining an intermediate chamber adjacent to and communicating through a central hole with said pump chamber, the intermediate chamber having at least an upper portion, a first compartment and a second compartment:

a power driven impeller shaft rotatably supported in the housing by at least one bearing disposed in the small diameter portion of the internal bore, the impeller shaft extending through the smaller diameter portion of the internal bore and the intermediate chamber into said pump chamber;

an impeller provided on said impeller shaft to rotate therewith and located in said pump chamber;

a seal mechanism provided in said small diameter portion of the internal bore to seal between the bore and the impeller shaft, the intermediate chamber being filled with liquid to a predetermined level with air being entrapped in the upper portion of the intermediate chamber when the pump is not in operation;

a liquid forcing device being provided in said second compartment for forcing when the pump is in operation the liquid in said second compartment so that at least a portion of the liquid in the second compartment is displaced to the first compartment to thereby displace the air in the first compartment into said second compartment whereby liquid in a region around the seal mechanism is displaced to make the seal mechanism substantially free from liquid, wherein the liquid forcing device includes a partition device located in said intermediate chamber dividing the intermediate chamber into said first compartment adjacent to said pump chamber and said second compartment the first and second compartments being communicatively connected at least through the upper portion of the intermediate chamber.

2. A liquid pump in accordance with claim 1 in which said partition device includes a partition wall member secured to said impeller shaft to rotate therewith, a radially inner portion of the partition wall member being formed for forcing said liquid from said second compartment to said first compartment.

3. A liquid pump in accordance with claim 2 in which said partition wall member is provided at a radially outward peripheral edge with an axially extending peripheral rim portion which continues at an axial end opposite to the partition wall member to a radially inwardly extending wall so that an annular space is defined between the partition wall member, the peripheral rim portion and the radially inwardly extending wall, the partition wall member being formed at a radially outward portion with at least one opening for communicating the annular space with the first compartment of the intermediate chamber.

4. A liquid pump in accordance with claim 1 in which said partition device includes an annular partition member having a central opening and secured at a radially outward peripheral edge portion to said housing, said partition member being formed at an upper portion with at least one opening for communicating the second compartment with the first compartment of the intermediate chamber.

5. A liquid pump in accordance with claim 4 in which a pumping device is provided on said impeller shaft and secured thereto for rotation therewith, said pumping device being located in said central opening of the partition member for forcing the liquid in the second compartment to the first compartment upon rotation of the impeller shaft.

6. A liquid pump in accordance with claim 1 in which said housing is formed with a radially inwardly extending flange between the small diameter portion and the large diameter portion of the internal bore, said impeller having an auxiliary seal operatively positioned in sealing contact with said flange.

7. A liquid pump in accordance with claim 6 in which said auxiliary seal is formed so as to be rotatable with the impeller shaft and of a type responsive to a centrifugal force so that contact between the auxiliary seal and the flange is at least weakened upon rotation of the impeller shaft.

8. A liquid pump in accordance with claim 1 in which said housing is provided a partition member between the pump chamber and the intermediate chamber, said partition member having a central opening through which said impeller shaft is passed with an annular clearance, a disc member being provided on said impeller shaft in said first compartment with a close clearance with said partition member, said disc member having a diameter which is sufficiently large so that the upper portion of the disc member extends beyond the liquid level in the intermediate chamber when the pump is not in operation.

9. A liquid pump in accordance with claim 8 in which said impeller has an impeller disc which is located at a side of the partition member opposite to the disc member on the impeller shaft with a close clearance with respect to said partition member.

10. A liquid pump, comprising:

a housing having a pump chamber and an internal bore of a stepped configuration including a small diameter portion and a large diameter portion with a radial wall surface therebetween, said large diameter portion defining an intermediate chamber adjacent to said pump chamber, said intermediate chamber having at least an upper portion, a first compartment and a second compartment;

a bearing carrying partition wall provided between said pump chamber and said intermediate chamber;

a power driven impeller shaft rotatably supported in the housing by at least one sleeve type bearing disposed in the bearing carrying partition wall, the impeller shaft extending through the smaller diameter portion of the internal bore and the intermediate chamber into said pump chamber;

an impeller provided on said impeller shaft to rotate therewith and located in said pump chamber;

a seal mechanism provided in said small diameter portion of the internal bore to seal between the bore and the impeller shaft, the intermediate chamber being filled with liquid to a predetermined level with air being entrapped in the upper portion of the intermediate chamber when the pump is not in operation; and a liquid forcing device being provided in said second compartment for forcing when the pump is in operation the liquid in said second compartment so that at least a portion of the liquid in the second compartment is displaced to the first compartment to thereby displace the air in the first compartment into said second compartment whereby liquid in a region around the seal mechanism is displaced to make the seal mechanism substantially free from liquid, wherein said liquid forcing device includes a partition device located in said intermediate chamber dividing the intermediate chamber into said first compartment adjacent to said pump chamber and said second compartment, the first and second compartments being connected together at least through the upper portion of the intermediate chamber.

11. A liquid pump in accordance with claim 10 in which said partition device includes a partition wall member secured to said impeller shaft to rotate therewith, a radially inner portion of the partition wall member being formed for forcing said liquid from said second compartment to said first compartment.

12. A liquid pump in accordance with claim 11 in which said partition wall member is provided at a radially outward peripheral edge with an axially extending peripheral rim portion which continues at an axial end opposite to the partition wall member to a radially inwardly extending wall so that an annular space is defined between the partition wall member, the peripheral rim portion and the radially inwardly extending wall, the partition wall member being formed at a radially outward portion with at least one opening for communicating the annular space with the first compartment of the intermediate chamber.

13. A liquid pump, comprising:

a housing having a pump chamber and an internal bore of a stepped configuration including a small diameter portion and a large diameter portion with a radial wall surface therebetween, said large diameter portion defining an intermediate chamber adjacent to and communicating through a central hole with said pump chamber, said intermediate chamber having at least an upper portion, a first compartment and a second compartment;

a power driven impeller shaft rotatably supported in the housing by at least one bearing disposed in the small diameter portion of the internal bore, the impeller shaft extending through the smaller diameter portion of the internal bore and the intermediate chamber into said pump chamber;

an impeller provided on said impeller shaft to rotate therewith and located in said pump chamber, said housing being formed with a cylindrical extension which extends from an inner end of the small diameter portion of the internal bore toward the large diameter portion to provide an annular space in the intermediate chamber, the intermediate chamber being filled with liquid to a predetermined level with air being entrapped in the upper portion of the intermediate chamber when the pump is not in operation; and a sealing mechanism;

a liquid forcing device being provided in said second compartment for forcing when the pump is in operation the liquid in said second compartment so that at least a portion of the liquid in the second compartment is displaced to the first compartment to thereby displace the air in the first compartment into said second compartment whereby liquid in a region around the seal mechanism is displaced to make the seal mechanism substantially free from liquid, wherein said liquid forcing device includes a partition device located in said intermediate chamber dividing the intermediate chamber into said first compartment adjacent to said pump chamber and said second compartment, said partition device having a peripheral portion extending axially into said annular space, said sealing mechanism being provided between said cylindrical extension and said peripheral portion of the partition device, and the first and second compartments being connected together at least at the upper portion of the intermediate chamber.

14. A liquid pump in accordance with claim 13 in which said seal mechanism is of a type responsive to a centrifugal force so that sealing function is at least weakened when said impeller shaft is rotated in operation of the pump.

15. A liquid pump, comprising:

a housing having a pump chamber and an internal bore of a stepped configuration including a small diameter portion and a large diameter portion with a radial wall surface therebetween, said large diameter portion defining an intermediate chamber adjacent to a central hole, said intermediate chamber including at least an upper portion, a first compartment and a second compartment;

a power driven impeller shaft rotatably supported in the housing by at least one bearing, the impeller shaft extending through the smaller diameter portion of the internal bore and the intermediate chamber into said pump chamber;

an impeller provided on said impeller shaft to rotate therewith and located in said pump chamber;

a seal mechanism for sealing substantially between the impeller shaft and the housing, the intermediate chamber being filled with liquid to a predetermined level with air being entrapped in the upper portion of the intermediate chamber when the pump is not in operation; and a liquid forcing device provided in said second compartment for forcing at least a portion of the liquid in said second compartment to displace to the first compartment, when the pump is in operation, thereby displacing the air in the first compartment to the second compartment and displacing liquid in a region around the seal mechanism so that the seal mechanism is maintained substantially free from liquid, wherein said liquid forcing device includes partition means located in said intermediate chamber for dividing the intermediate chamber into said first compartment adjacent to said pump chamber and said second compartment, the first and second compartments being connected together at least through the upper portion of the intermediate chamber.

16. A liquid pump, comprising:

a housing having a pump chamber and an internal bore of a stepped configuration including at least one small diameter portion and a large diameter portion with a radial wall surface therebetween, said large diameter portion defining an intermediate chamber adjacent to and communicating through a central hole with said pump chamber, the intermediate chamber having at least an upper portion, a first compartment and a second compartment;

a power driven impeller shaft rotatably supported in the housing by at least one bearing disposed at a side of the at least one small diameter portion of the internal bore, the impeller shaft extending through the at least one smaller diameter portion of the internal bore and the intermediate chamber into said pump chamber;

an impeller provided on said impeller shaft to rotate therewith and located in said pump chamber;

a seal mechanism provided in said small diameter portion of the internal bore to seal between the bore and the impeller shaft, the intermediate chamber being filled with liquid to a predetermined level with air being entrapped in the upper portion of the intermediate chamber when the pump is not in operation;

a liquid forcing device being provided in said second compartment for forcing when the pump is in operation the liquid in said second compartment so that at least a portion of the liquid in the second compartment is displaced to the first compartment to thereby displace the air in the first compartment into said second compartment whereby liquid in a region around the seal mechanism is displaced to make the seal mechanism substantially free from liquid, wherein the liquid forcing device includes a partition device located in said intermediate chamber dividing the intermediate chamber into said first compartment adjacent to said pump chamber and said second compartment, the first and second compartments being communicatively connected at least through the upper portion of the intermediate chamber.

17. A liquid pump in accordance with claim 16 in which said housing is provided with a partition member between the pump chamber and the intermediate chamber, said partition member having a central opening through which said impeller shaft is passed with an annular clearance, a disc member being provided on said impeller shaft in said first compartment with a close clearance with said partition member.

18. A liquid pump in accordance with claim 17 in which said impeller has an impeller disc which is located at a side of the partition member opposite to the disc member on the impeller shaft with a clearance with respect to said partition member.

* * * * *